United States Patent [19]

Konishi

[11] Patent Number: 4,605,207
[45] Date of Patent: Aug. 12, 1986

[54] FLUID-FILLED RESILIENT BUSHING

[75] Inventor: Keizo Konishi, Nagoya, Japan

[73] Assignee: Tokai Rubber Industries, Ltd., Komaki, Japan

[21] Appl. No.: 639,674

[22] Filed: Aug. 9, 1984

[30] Foreign Application Priority Data

Aug. 27, 1983 [JP] Japan .................. 58-156772

[51] Int. Cl.⁴ .................. F16M 1/00; B60G 11/18
[52] U.S. Cl. .................. 267/57.1 R; 267/140.1; 384/222; 403/225
[58] Field of Search .................. 267/63 R, 63 A, 136, 267/140.1, 140.3, 141.2, 153, 154, 57.1 R, 57.1 A, 35, 21 R, 57, 113, 140.4; 180/73.4; 308/4 R; 384/276, 297, 220, 202, 222, 234; 188/378, 379; 403/225; 264/242, 261

[56] References Cited

U.S. PATENT DOCUMENTS

| | | | |
|---|---|---|---|
| 3,642,268 | 2/1972 | Hipsher | 267/57.1 R |
| 4,007,924 | 2/1977 | Jorn et al. | 267/57.1 R |
| 4,032,202 | 6/1977 | Ishikawa et al. | 267/57.1 R X |
| 4,377,216 | 3/1983 | Ueno | 267/140.1 X |

FOREIGN PATENT DOCUMENTS 2362504  7/1974  Fed. Rep. of Germany ..... 267/57.1 R
2726676  1/1979  Fed. Rep. of Germany ...... 267/153

*Primary Examiner*—Bruce H. Stoner, Jr.
*Assistant Examiner*—Robert J. Oberleitner
*Attorney, Agent, or Firm*—Browdy and Neimark

[57] ABSTRACT

A fluid-filled resilient bushing structure having a resilient member interposed between an inner sleeve and an outer sleeve disposed radially outwardly of the inner sleeve. The resilient member has portions in which are formed plural fluid chambers which are filled with an incompressible fluid and held in communication with each other through an orifice. The resilient bushing structure comprises a non-fixed independent radial stop member of a rigid material accommodated in at least one of the plural fluid chambers and movable in this at least one fluid chamber. The radial stop member is abuttable on surfaces defining the at least one fluid chamber, thereby preventing an excessive displacement of the inner and outer sleeves relative to each other in a radial direction thereof.

11 Claims, 4 Drawing Figures

FLUID-FILLED RESILIENT BUSHING

BACKGROUND OF THE INVENTION

The present invention relates generally to improvements in a fluid-filled bushing structure for vibration damping or isolation, and more particularly to such a fluid-filled bushing structure which has means for protecting a resilient member against excessive deformation of strain and which is excellent in durability.

In the art of a suspension system for use, for example, on an automotive vehicle, various types of suspension members in the form of arms, rods, links, etc., are connected to the vehicle chassis to suspend a differential gear, wheels, and similar parts of the vehicle so that the suspension members are pivotable in various directions. To damp or absorb vibrations, suspension dampers or isolators in the form of bushings have been commonly used as pivotal connections at both ends of each suspension member. It is also known to use similar bushings as engine mounts which are interposed between an engine and the vehicle chassis to restrain transmission of vibrations from the engine.

Generally, a bushing structure serving as a vibration damper or shock absorber like such suspension bushing or engine mount as stated above, comprises an inner metal sleeve through which is inserted a suitable fulcrum shaft for suspension purpose of the vehicle, an outer metal sleeve disposed concentrically with the inner metal sleeve, and an annular resilient or elastomeric member radially compressed between the inner and outer metal sleeves for damping vibrations through deformation or compression thereof. In recent years, however, it has been proposed to employ a compound bushing structure, i.e., a fluid-filled bushing which is capable of effecting a required vibration damping without having to use a rubber or resilient material of particularly high damping coefficient for the resilient member.

More specifically described, a resilient member interposed between the inner and outer metal sleeves of such a compound bushing as stated above has a plurality of recesses which cooperate with the inner wall surface of the outer metal sleeve to form pockets or fluid chambers which are filled with a suitable incompressible fluid and arranged to be in fluid communication with each other through an orifice. The fluid flows through the orifice from one of the fluid chambers to another upon transmission of vibrations to the bushing, and thus the orifice provides a resistance to the fluid flow which gives a good damping effect.

While such compound bushing structure known in the art is able to provide a desired fluid damping force by means of a resistance (viscosity resistance) to the fluid flow through the orifice, no provisions are made for prevention of an excessive displacement between the inner and outer cylindrical members (sleeves) relative to each other. More particularly, no means are provided for protection against excessive deformation or deflection of the resilient member or rubber insert interposed between the inner and outer sleeves. Under these conditions, the resilient member is deformed according to the magnitude of a load applied thereto. Upon application of an extremely high load, the resilient member may have an excessive deformation (strain), and tends to be damaged due to repetitive deformation thereof in such excessive degree. Thus, the prior art compound bushing structure suffers a problem of low durability or short life.

SUMMARY OF THE INVENTION

It is therefore an object of the present invention to provide a fluid-filled bushing structure which has means for effectively protecting its resilient member such as a rubber member against excessive deformation upon application of an excessively high load to the bushing structure.

According to the invention, there is provided a fluid-filled resilient bushing structure wherein a resilient member is interposed between an inner sleeve and an outer sleeve disposed radially outwardly of the inner sleeve with a predetermined radial distance therebetween, the resilient member having portions at least partially defining each of plural fluid chambers which are filled with an incompressible fluid and held in communication with each other through an orifice, the resilient bushing structure comprising a non-fixed independent radial stop member of a rigid material accommodated in at least one of the plural fluid chambers and movable in the at least one fluid chamber, the radial stop member being abuttable on surfaces which define the fluid chamber, and thereby preventing an excessive displacement of the inner and outer sleeves relative to each other in a radial direction thereof perpendicular to axes of the inner and outer sleeves.

In the fluid-filled resilient bushing structure constructed as described above, the abutment of the radial stop member on the inner surface of the corresponding fluid chamber will prevent a relative radial displacement of the inner and outer sleeves beyond a predetermined distance, and thereby protect the resilient member therebetween against an excessive amount of its deformation or strain in the radial direction even in the event of application of an excessively high load to the resilient bushing structure. Hence, the radial stop member serves to effectively protect the resilient member against damage thereof due to excessive deformation, and contributes to a significant increase in durability of the resilient bushing and consequently of the bushing structure as a whole.

Since the radial stop member is not fixed in the fluid chamber and free to move therein independently of the inner and outer sleeves, a torsional or circumferential displacement of the inner and outer sleeves relative to each other will not cause the radial stop member to damage the portions of the resilient member which define at least a part of the fluid chamber. That is, the non-fixed arrangement of the radial stop member is effective in increasing the durability of the resilient member. Described in more detail, if a stop member is fixed, for example to an inner sleeve, a relative torsional displacement between the inner sleeve and an outer sleeve will cause the stop member to be moved with the inner sleeve in a circumferential direction of the sleeves, and as a result depress the lateral wall surfaces of the resilient member which partially define the fluid chamber. Repetitive depressing actions of the stop member against the wall surfaces of the resilient member will damage the resilient member. On the contrary, the radial stop member of the instant bushing structure is fixed to neither the inner sleeve nor the outer sleeve. Therefore, substantially no forced circumferential movement of the stop member takes place when the inner and outer sleeves are displaced circumferentially relative to each other. Accordingly, depression of the stop member against the lateral wall surfaces of the resilient member, and the consequent damage thereto are minimized, whereby the service life of the resilient member is prolonged, i.e., the durability of the bushing structure is increased.

According to one advantageous embodiment of the invention, the bushing structure further comprises an annular member press-fitted on an outer peripheral surface of the inner sleeve, and the orifice comprises an annular fluid passage which is defined by an annular groove formed in the outer peripheral surface of the inner sleeve and by an inner peripheral surface of the annular member. The orifice further comprises radial holes each of which is formed through a wall thickness of the annular member and held in communication with the annular groove at one end thereof, and with a respective one of the fluid chambers at the other end thereof.

In one preferred form of the above embodiment, an outer peripheral surface of the annular member except an area thereof in which the radial hole is open, is covered with a rubber layer. In this instance, the radial stop member is abuttable on the rubber layer.

According to another advantageous embodiment of the invention, the fluid chamber in which the radial stop member is accommodated has opposite lateral sides which are defined by lateral wall surfaces of the resilient member which are parallel to the axes of the inner and outer sleeves. The fluid chamber is formed such that a circumferential distance between the opposite lateral sides (lateral wall surfaces) thereof is gradually decreased in the radial direction from the outer sleeve toward the inner sleeve. The radial stop member is generally arcuate in shape substantially following a circular arc of the outer sleeve, and a circumferential length of the arcuate radial stop member is selected to be larger than said circumferential distance as measured at a radially innermost position of the fluid chamber adjacent to the inner sleeve, but smaller than said circumferential distance as measured at a radially outermost position of the fluid chamber adjacent to the outer sleeve.

In accordance with a further advantageous embodiment of the invention, the fluid chamber in which the radial stop member is accommodated has a bottom adjacent to an outer peripheral surface of the inner sleeve, and the orifice is open in the bottom of the fluid chamber. The bottom has a communicating groove one end of which communicates with an open end of the orifice and the other end of which communicates with the fluid chamber, so that the orifice is kept in communication with the fluid chamber through the communicating groove even while the radial stop member is in abutting contact with the bottom of the fluid chamber.

In one preferred form of the above embodiment, the communicating groove is formed in a rubber layer which covers an outer peripheral surface of an annular member pressed-fitted on the inner sleeve. The orifice is open at one end thereof in this annular member.

According to another advantageous embodiment of the invention, an outer rigid member of cylindrical shape is disposed in pressed contact with an outer peripheral surface of the resilient member except areas thereof in which the plural fluid chambers are formed.

According to a still further embodiment of the invention, an inner peripheral surface of the outer sleeve is covered with a rubber layer. In this instance, the radial stop member is abuttable on this rubber layer.

BRIEF DESCRIPTION OF THE DRAWING

The above and other objects, features and advantages of the present invention will become more apparent from reading the following description of the preferred embodiments taken in connection with the accompanying drawing in which.

DETAILED DESCRIPTION OF THE PREFERRED EMBODIMENTS

To further clarify the present invention, preferred embodiments of the invention will be described in detail with reference to the accompanying drawing.

Figure 1:
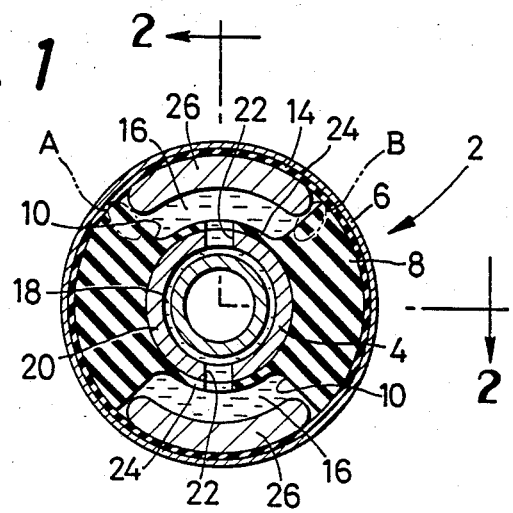
FIG. 1 is an elevational view in transverse cross section (taken along line 1—1 of FIG. 2) of one embodiment of a suspension bushing structure of the present invention.
Figure 2:
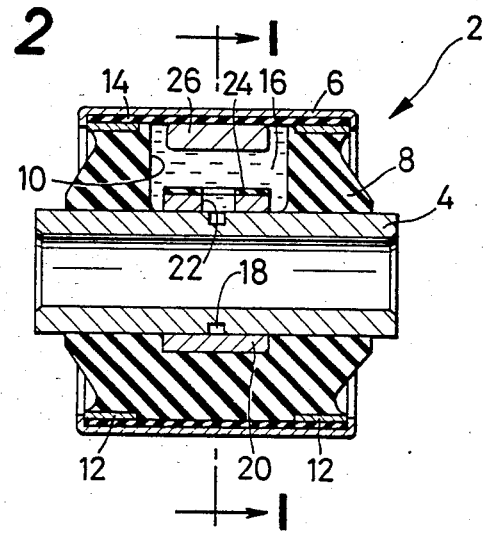
FIG. 2 is a cross sectional view taken along line 2—2 of FIG. 1.

In FIGS. 1 and 2, one form of a fluid-filled resilient bushing structure of the invention is indicated generally at 2. In a core or innermost portion of the bushing structure 2, there is disposed a comparatively thick-walled, cylindrical inner metal sleeve 4 through which is inserted a fulcrum shaft that is supported by a pair of brackets secured to a chassis, axle housing, or similar parts of a vehicle. The inner metal sleeve 4 serves as an inner cylindrical member of the structure 2. An outer metal sleeve 6, which serves as an outer cylindrical member of the structure 2, is disposed radially outwardly of, and concentrically with, the inner metal sleeve 4, with a predetermined radial distance therebetween. Between these inner and outer metal sleeves 4 and 6, there is interposed a generally annular rubber member 8 which serves as a resilient or elastic member of the structure 2.

The rubber member 8 has two recesses 10, 10 which are formed in diametrically opposite circumferential portions thereof so that the recesses 10, 10 are symmetrical to each other with respect to the inner metal sleeve 4. A pair of relatively thin-walled metal rings 12 with a small width are disposed at axially opposite end portions of the rubber member 8 such that the metal rings 12 are located on opposite sides of openings of the recesses 10. The inner surface of the outer metal sleeve 6 is substantially entirely covered with a rubber layer 14 with a suitable thickness. This rubber layer 14 serves as a resilient layer for the outer metal sleeve 6.

The outer metal sleeve 6 with the rubber layer 14 on its inner surface encloses the openings of the recesses 10 in the rubber member 8, thus cooperating with the rubber member 8 to define two fluid chambers 16, 16 which are filled with a suitable incompressible fluid such as water, polyalkylene glycols, silicone oil, low molecular weight polymers, and a mixture thereof. The rubber layer 14 on the inner surface of the outer metal sleeve 6 is held in pressed contact with the metal rings 12 fitted on the outer surface of the rubber member 8, thereby providing a fluid-tightness between the outer metal sleeve 6 and the metal rings 12, and preventing a leakage flow of the incompressible fluid out of the fluid chambers 16, 16.

The two fluid chambers 16, 16 are held in communication with each other through an orifice. Described more specifically, an annular groove 18 is formed in the outer peripheral surface of an axially central portion of the inner metal sleeve 4, while an annular member 20 made of a suitable metal is disposed in pressed contact with the outer surface of the central portion of the inner metal sleeve 4. Thus, the annular groove 18 and the inner surface of the annular member 20 cooperate to define an annular fluid passage (18). The annular member 20 has two radial holes 22, 22 which communicate at one end thereof with the annular groove (annular fluid passage) 18 and at the other end thereof with the two fluid chambers 16, 16. Thus, in this specific embodiment, the two fluid chambers 16, 16 communicate with each other through an orifice which consists of the annular fluid passage (18) and the radial holes 22.

The annular member 20 has a first pair of diametrically opposite circumferential portions which are held in contact with the inner surface of the rubber member 8, and a second pair of diametrically opposite circumferential portions which are located between the first pair of circumferential portions. The second pair of circumferential portions define bottom walls of the respective fluid chambers 16, and are covered, over the entire area except the opening of the radial holes 22, with rubber layers 24 which are formed integrally with the rubber member 8. The rubber layers 24 for the inner metal sleeve 4 are located opposite to the rubber layers 14 for the outer metal sleeve 6.

As clearly shown in FIG. 2, the wall surfaces of the rubber member 8 which define opposite ends of each fluid chamber 16 (recess 10) as viewed axially of the rubber member 8 are parallel to each other, and perpendicular to the axis of the inner metal sleeve 4. On the other hand, as shown in FIG. 1, the wall surfaces of the rubber member 8 which define opposite lateral sides of each fluid chamber 16 as viewed circumferentially of the rubber member 8 (as viewed in transverse cross section of FIG. 1) are not parallel to each other. Stated in more detail, each fluid chamber 16 is formed in a generally sectorial shape in the transverse cross section such that a circumferential distance between the opposite lateral sides in the transverse cross section is gradually decreased in a radial direction from the outer metal sleeve 6 toward the inner metal sleeve 4. That is, the opposite lateral sides of the fluid chamber 16, 16 are defined by the lateral wall surfaces of the rubber member 8 which extend in the radial directions, as shown in FIG. 1.

In each of the fluid chambers 16, 16 of the above described configuration, there is accommodated a radial stop member 26 made of a suitable metal which is not fixed to the outer metal sleeve 6, inner metal sleeve 4, or rubber member 8. In the longitudinal cross section in FIG. 2 (in a plane taken along the axis of the bushing structure 2), the radial stop member 26 has a substantially rectangular configuration parallel to the axis of the outer metal sleeve 6, and is located between the axially opposite parallel ends of the corresponding fluid chamber 16 with suitable axial clearances to the wall surfaces of the rubber member 8 which define these axially opposite ends of the chamber 16. In the transverse cross section in FIG. 1 (in a plane taken across the axis of the bushing structure 2), the radial stop member 26 has an arcuate configuration along a corresponding circular arc of the outer metal sleeve 6. The length of the radial stop member 26 in the circumferential direction of the bushing structure 2 is larger than the circumferential distance of the fluid chamber 16 as measured at the radially innermost position (at the bottom of the chamber 16) adjacent to the inner metal sleeve 4, but slightly smaller than the circumferential distance of the chamber 16 as measured at the radially outermost position adjacent to the outer metal sleeve 6. In this arrangement, the radial stop member 26 is normally positioned on the side of the outer metal sleeve 6. That is, a given distance of radial movement of the radial stop member 26 will cause its circumferentially opposite ends to come into contact with the corresponding tapered opposite lateral wall surfaces of the rubber member 8 which define the circumferentially opposite lateral sides of the fluid chamber 16. As a result, the radial stop member 26, which is not fixed and movable in the fluid chamber 16, is not able to close the opening of the corresponding radial hole 22.

The suspension bushing structure 2 constructed as described hitherto is manufactured in a process as described below.

At first, the annular member 20 is press-fitted on the central portion of the inner metal sleeve 4 to form an assembly (4, 20). This assembly (4, 20) and the two metal rings 12 are concentrically disposed in a mold relative to each other so that the metal rings 12 are spaced a predetermined axial distance from each other. A fluidized rubber material mixed with a vulcanizer is injected into the mold to fill the voids or cavities therein with the injected material, so that the rubber member 8 is molded while at the same time the assembly (4, 20), metal rings 12 and rubber member 8 are bonded to each other as a unit. In fabricating this unit, the openings of the radial holes 22 are plugged or closed with suitable caps in order to prevent the rubber material from flowing into the radial holes 22. Further, while the rubber member 8 is molded through vulcanization, the previously indicated two recesses 10 are formed between the two metal rings 12 so that the recesses 10 are open in the outer peripheral surface of the rubber member 8.

The thus formed bushing unit is then subjected to a commonly practiced shrink drawing or reducing operation by means of a drawing die or dies. The drawing operation is effected through the metal rings 12 on the periphery of the bushing unit in order to radially inwardly compress the rubber member 8, i.e., to obtain a desired reduction in diameter of the rubber member 8. Thus, the pre-compression of the rubber member 8 is achieved for improvement in its durability.

A similar vulcanization process is conducted on the outer metal sleeve 6 to form a covering of the rubber layer 14 with the predetermined thickness over substantially the entire area of the inner surface. Subsequently, the radial stop members 26 are installed in the respective recesses 10 in the rubber member 8, and the bushing unit is inserted into the outer metal sleeve 6 in a bath filled with a suitable incompressible fluid as indicated previously. During this assembling in the bath, the fluid chambers 16 defined by the recesses 10 and the inner surface of the outer metal sleeve 6 are filled with the incompressible fluid in an easy and efficient manner. Then, a drawing operation is effected on the outer metal sleeve 6 while the thus obtained bushing structure 2 remains in the bath of the fluid, or after it is taken out from the bath for exposure to the atmosphere, in order to give a desired radial compression to the rubber layer 14 between the outer metal sleeve 6 and the metal rings 12, and thereby secure a perfect sealing therebetween. Thus, the fluid chambers 16 are filled with the incompressible fluid. The axially opposite open end portions of the outer metal sleeve 6 are then clinched or flanged radially inwardly so as to be in contact with the corresponding opposite end faces of the rubber member 8, as shown in FIG. 2, for prevention of an axial displacement between the outer metal sleeve 6 and the rubber member 8. Thus, the suspension bushing structure 2 as shown in FIGS. 1 and 2 is manufactured.

The bushing structure 2 constructed and manufactured as described above, is suitably used as a vibration damping unit, for example, in a 4-link type suspension mechanism. In this instance, the outer metal sleeve 6 is fitted in an arm eye of a control arm, while a fulcrum shaft provided on a vehicle chassis or axle housing is inserted in the inner metal sleeve 4.

In the suspension bushing structure 2, high-frequency vibrations are damped or attenuated primarily by elastic deformation of the rubber member 8, while low-frequency vibrations are damped primarily by means of a resistance to a flow of the incompressible fluid from one of the fluid chambers 16 to the other through the orifice consisting of the radial holes 22 and annular fluid passage (18).

Upon application of an excessively high load to the inner metal sleeve 4, and/or the outer metal sleeve 6, the radial stop members 26 provided in the fluid chambers 16 will work to prevent an excessive degree of deformation of the rubber member 8 beyond a predetermined maximum limit. In other words, when an excessively large amount of displacement takes place between the inner and outer metal sleeves 4 and 6 in their radial direction, and consequently a large amount of elastic deformation occurs in the rubber member 8, the inner and outer surfaces of the radial stop members 26 come into abutment with the opposite rubber layers 24 and 14 on the annular member 20 and the outer metal sleeve 6, which rubber layers 24, 14 define the bottom and the top of the fluid chambers 16. Hence, the radial stop members 26 protect the rubber member 8 against excessive deformation thereof beyond its predetermined maximum limit, whereby the durability of the rubber member 8 is increased. Further, the prevention of excessive deformation of the rubber member 8 contributes to maintenance of fluid-tightness between the outer metal sleeve 6, and portions of the rubber member 8 which are subject to a tensile load during deformation thereof.

Further, since the radial stop members 26 are fixed neither to the inner metal sleeve 4 nor to the outer metal sleeve 6, the application of a torsional force to the inner and outer metal sleeves 4, 6 relative to each other will cause substantially no torsional load to be applied to the radial stop members 26, even though the rubber member 8 undergoes a slight degree of torsional deformation. Stated the other way, such a torsional force will not cause the opposite ends of each arcuate radial stop member 26 to force or depress, in a repeated fashion, opposite lateral wall portions A and B (see FIG. 1) of the rubber member 8 which partially define the lateral sides of the corresponding fluid chamber 16. As a result, these lateral wall portions A and B are protected against damage due to repeated depressing actions of the radial stop member 26. In this respect, the significance of the instant bushing structure 2 may be understood from recognizing that, if the radial stop member 26 was secured to the inner or outer metal sleeve 4 or 6, the application of a torsional force to the inner metal sleeve 4 and/or outer metal sleeve 6 to such an extent as to cause a relative angular displacement of 10 degrees or more, would cause to move the radial stop member 26 and seriously damage the wall portions A and B of the rubber member 8 or greatly shorten the service life of these portions A and B. In this embodiment of the invention, however, the radial stop member 8 is not in fact secured to the inner or outer metal sleeve 4, 6, and therefore will not damage the lateral wall portions A and B of the rubber member 8 even when such a large degree of relative angular or circumferential displacement takes place between the two metal sleeves 4 and 6. Thus, the durability of the rubber member 8 is significantly improved.

In the suspension bushing structure 2 of the foregoing construction, a direct abutting contact of the metallic stop member 26 with the inner and outer metal sleeves 4, 6, and resultant generation of metallic abutting noises are avoided, because the surfaces of the inner and outer metal sleeves 4, 6 opposite to the abutting surfaces of the radial stop members 26 are covered with the rubber layers 24 and 14, respectively, as previously described. Further, the radial stop members 26 are held spaced from the openings of the radial holes 22 in the radial directions, because each fluid chamber 16 accommodating the stop member 26 is formed so that the circumferential distance (in FIG. 1) between the opposite lateral wall surfaces is gradually decreased in the radially inward direction, and because the circumferential length of the stop member 26 is selected to be greater than the circumferential distance of the chamber 16 at its bottom. Consequently, the radial stop members 26 will not be positioned close to the openings of the radial holes 22, and will not prevent a smooth flow of the incompressible fluid through the radial holes 22 which constitute portions of the orifice communicating with the two fluid chambers 16.

Further, since the above indicated orifice is formed by the annular groove 18 in the inner metal sleeve 4 and by the inner surface of the metallic annular member 20, the effective cross sectional area of the orifice is kept constant, i.e., a constant degree of restriction of the fluid flow through the orifice is maintained, irrespective of elastic deformation of the rubber member 8. As a result, the suspension bushing structure 2 of the instant embodiment provides a stable vibration damping capability.

While the present invention has been described in its preferred embodiment, it is to be understood that the invention is not limited thereto; but may be otherwise embodied.

Figure 3:
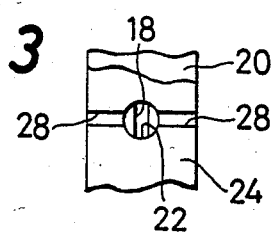
FIG. 3 is an enlarged plan view showing another embodiment of the invention.

For example, as shown in FIG. 3, it is appreciated that an axial communicating groove 28 be formed in each of the rubber layers 24 which cover the diametrically opposite circumferential portions of the annular member 20 defining the bottoms of the respective fluid chambers 16. Each communicating groove 2 is cut in the outer peripheral surface of the corresponding rubber layer 24 so as to extend from the opening of the radial hole 22 in the rubber layer 24 in opposite directions parallel to the axis of the annular member 20, across the entire width of the annular member 20. In this modified embodiment, the radial hole 22 is held in communication with the corresponding fluid chamber 16 through the communicating groove 28, even while the radial stop member 26 is kept in contact with the outer surface of the rubber layer 24 and the opening of the radial hole 22 is closed by the radial stop member 26. Even in this condition, the opposite axial ends of the axial communicating groove 28 are open to the fluid chamber 16, whereby the incompressable fluid may flow from one of the fluid chambers 16 to the other through the communicating grooves 28. In the case where the communicating grooves 28 are additionally provided as shown in FIG. 3, the dimensions and configurations of the fluid chambers 16 and the radial stop members 26 may be modified or selected so that the radial stop members 26 may be seated on the corresponding rubber layers 24 on the annular member 20, as indicated at 30 in FIG. 4.

Figure 4:
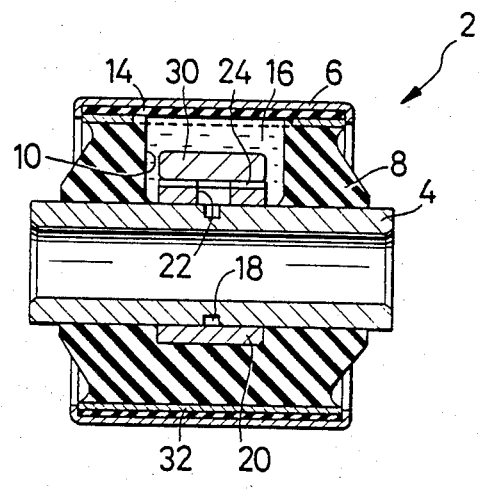
FIG. 4 is a cross sectional view corresponding to FIG. 2, showing the embodiment of FIG. 3.

While the preceding embodiment of FIGS. 1 and 2 uses the two metal rings 12 disposed on the opposite axial end portions of the rubber member 8, these two metal rings 12 may be replaced by a single cylindrical member made of a suitable metal, as shown in FIG. 4. In this case, the cylindrical member is provided with two cutouts or openings which are aligned with the two recesses 10, 10 in the rubber member 8. The metal rings 12 or an alternative cylindrical member are (is) effective in giving preliminary compression to the rubber member 8 or in facilitating the installation of the outer metal sleeve 6 in pressed relation with the rubber member 8. However, the suspension bushing structure 2 may serve its intended function without the metal rings 12 or other members functionally equivalent to the rings 12.

In the illustrated embodiments, the two fluid chambers 16, 16 are held in communication with each other through the orifice (annular groove 18 and radial holes 22, 22) which is formed so as to extend through the inner metal sleeve 4 and the annular member 20. However, the orifice to be provided as a restricted fluid passage according to the invention may take other forms, provided the two fluid chambers 16, 16 are adapted to communicate with each other through such a restricted fluid passage. For example, the annular groove 18 may be replaced by a groove which is formed in a portion of the entire outer circumference of the inner metal sleeve 4. It is also possible to use a known arrangement wherein an orifice or a restricted fluid passage is formed in or adjacent to the outer metal sleeve 6 or in the rubber member 8.

While the illustrated bushing structure 2 has the two fluid chambers 16, 16 and the two radial stop members 26, 26 accommodated in the respective chambers 16, 16, it is possible to provide three or more fluid chambers or pockets and to provide only a selected one of the fluid chambers with a suitable radial stop member.

It is to be understood that other various changes and modifications may occur to those skilled in the art in the light of the foregoing teachings, without departing from the scope of the invention defined in the appended claims.

What is claimed is:

1. A fluid-filled resilient bushing structure wherein a resilient member is interposed between an inner sleeve and an outer sleeve disposed radially outwardly of the inner sleeve with a predetermined radial distance therebetween, said resilient member having portions at least partially defining plural fluid chambers which are filled with an incompressible fluid and held in communication with each other through an orifice, said resilient bushing structure comprising:

a movable radial stop member of a rigid material accommodated in at least one of said plural fluid chambers and movable relative to a pair of circumferential surfaces which partially define said at least one fluid chamber and which are opposed to each other in a radial direction of said inner and outer sleeves, said radial stop member being abuttable on said circumferential surfaces, and thereby preventing an excessive displacement of said inner and outer sleeves relative to each other in the radial direction thereof perpendicular to axes of the inner and outer sleeves.

2. A fluid-filled bushing resilient bushing structure as claimed in claim 1, further comprising an annular member press-fitted on an outer peripheral surface of said inner sleeve, and wherein said orifice comprises an annular fluid passage which is defined by an annular groove formed in said outer peripheral surface of the inner sleeve and by an inner peripheral surface of said annular member, and further comprises radial holes each of which is formed through a wall thickness of said annular member and held in communication with said annular groove at one end thereof, and with a respective one of said fluid chambers at the other end thereof.

3. A fluid-filled bushing resilient structure as claimed in claim 1, wherein said resilient member has lateral wall surfaces which are parallel to said axes of the inner and outer sleeves and which define opposite lateral sides of said at least one fluid chamber parallel to said axes, said at least one fluid chamber being formed such that a circumferential distance between said opposite lateral sides thereof is gradually decreased in said radial direction from said outer sleeve toward said inner sleeve, and wherein said radial stop member is generally arcuate in shape substantially following a circular arc of said outer sleeve, a circumferential length of the arcuate radial stop member being larger than said circumferential distance as measured at a radially innermost position of said at least one fluid chamber adjacent to said inner sleeve, and smaller than said circumferential distance as measured at a radially outermost position of said at least one fluid chamber adjacent to said outer sleeve.

4. A fluid-filled resilient bushing structure as claimed in claim 1, wherein said at least one fluid chamber has a bottom adjacent to an outer peripheral surface of said inner sleeve, said orifice being open in said bottom of said at least one fluid chamber, said bottom having a communicating groove one end of which communicates with an open end of said orifice and the other end of which communicates with said at least one fluid chamber, so that said orifice is kept in communication with said at least one fluid chamber through said communicating groove even while said radial stop member is in abutting contact with said bottom.

5. A fluid-filled resilient bushing structure as claimed in claim 2, wherein said annular member defines a bottom of said at least one fluid chamber and is provided with a communication groove one end of which communicates with an end of said radial hole open in said bottom, and the other end of which communicates with said at least one fluid chamber, so that said orifice is kept in communication with said at least one fluid chamber through said communicating groove even while said radial stop member is in abutting contact with said bottom.

6. A fluid-filled resilient bushing structure as claimed in claim 2, wherein an outer peripheral surface of said annular member except an area thereof in which said radial hole is open is covered with a rubber layer, said said radial stop member being abuttable on said rubber layer.

7. A fluid-filled resilient bushing structure as claimed in claim 5, wherein an outer peripheral surface of said annular member except an area thereof in which said radial hole is open is covered with a rubber layer, said communicating groove being formed in said rubber layer.

8. A fluid-filled resilient bushing structure as claimed in claim 1, wherein an inner peripheral surface of said outer sleeve is covered with a rubber layer, said radial stop member being abuttable on said rubber layer.

9. A fluid-filled resilient bushing structure as claimed in claim 1, further comprising an outer rigid member of cylindrical shape in pressed contact with an outer peripheral surface of said resilient member except areas thereof in which said plural fluid chambers are formed.

10. A fluid-filled resilient bushing structure as claimed in claim 9, wherein an inner peripheral surface of said outer sleeve is covered with a rubber layer, said outer rigid member being held in pressed contact with said rubber layer, whereby a fluid tightness of said plural fluid chambers is maintained.

11. A fluid-filled resilient bushing structure as claim 1, further comprising a pair of outer rigid members of cylindrical shape in pressed contact with axially opposite end portions of said resilient member.

* * * * *